(12) United States Patent
Bando (10) Patent No.: US 6,218,793 B1
(45) Date of Patent: Apr. 17, 2001

(54) PLATE GLASS SNAPPING MACHINE

(75) Inventor: Shigeru Bando, Tokushima (JP)

(73) Assignee: Bando Kiko Co., Ltd., Tokushima (JP)

( * ) Notice: Subject to any disclaimer, the term of this patent is extended or adjusted under 35 U.S.C. 154(b) by 0 days.

(21) Appl. No.: 09/486,245

(22) PCT Filed: Aug. 28, 1998

(86) PCT No.: PCT/JP98/03849

§ 371 Date: Feb. 24, 2000

§ 102(e) Date: Feb. 24, 2000

(87) PCT Pub. No.: WO00/12439

PCT Pub. Date: Mar. 9, 2000

(51) Int. Cl.$^7$ .............................. B23Q 5/10; C03B 33/037
(52) U.S. Cl. .............................. 318/39; 225/96.5; 225/97
(58) Field of Search .................. 318/35, 39, 49, 318/66, 85; 225/96.5, 97, 94, 103

(56) References Cited

U.S. PATENT DOCUMENTS

| | | |
|---|---|---|
| 3,216,635 | 11/1965 | Lefevre . |
| 3,917,139 | 11/1975 | Kabanov et al. . |
| 4,371,103 | * 2/1983 | Siemens et al. ..................... 225/96.5 |
| 4,646,955 | 3/1987 | Garrick et al. . |
| 4,698,088 | 10/1987 | Bando . |
| 5,221,034 | 6/1993 | Bando . |
| 5,301,867 | 4/1994 | Bando . |
| 5,400,939 | 3/1995 | Bando . |
| 5,873,773 | * 2/1999 | Bando ................................... 225/94 |

FOREIGN PATENT DOCUMENTS

| | | |
|---|---|---|
| 61-168547 | 7/1986 | (JP) . |
| 62-78123 | 4/1987 | (JP) . |
| 63-25237 | 2/1988 | (JP) . |
| 63-206322 | 8/1988 | (JP) . |
| 10073213 | 11/1988 | (JP) . |
| 5-70163 | 3/1993 | (JP) . |
| 7-106922 | 11/1995 | (JP) . |
| 07043424 | 8/1996 | (JP) . |
| 8-217475 | 8/1996 | (JP) . |
| 07132723 | 11/1996 | (JP) . |
| 8-301630 | 11/1996 | (JP) . |
| 08156241 | 12/1997 | (JP) . |
| 9-315834 | 12/1997 | (JP) . |
| 2970117 | 11/1999 | (JP) . |

* cited by examiner

Primary Examiner—Khanh Dang
(74) Attorney, Agent, or Firm—Nixon & Vanderhye (57) ABSTRACT

A machine for bend-breaking a glass plate 1 comprises: an endless belt 3 on which the glass plate 2 is placed; a supporting member 4 for supporting the endless belt 3; a glass plate receiving device 7 including a glass plate receiving surface 6 for receiving the glass plate 2 from a lower surface of the glass plate 2 by means of the endless belt 3; a moving device 8 for moving the glass plate receiving surface 6 of the glass plate receiving device 7; a press-breaking device 9 including a pressing surface 87 for press-breaking the glass plate 2; a moving device 10 for moving the pressing surface 87 of the press-breaking device 9; and a carrying-in and carrying-out means 11 for carrying the glass plate 2 to be subjected to bend-breaking in and for carrying the glass plate 2 subjected to bend-breaking out. The moving devices 9 and 10 operate such that a moving position of the pressing surface 87 corresponds to a moving position of the glass plate receiving surface 6 in a press-breaking operation of the pressing surface 87 of the press-breaking device 9 for the glass plate 2.

22 Claims, 9 Drawing Sheets

PLATE GLASS SNAPPING MACHINE

TECHNICAL FIELD

The present invention relates to a machine for bend-breaking a glass plate or the like.

BACKGROUND ART

Glass-plate bend-breaking machines have been proposed in which a press-breaking device is moved within a plane, which is parallel to the surface of a glass plate placed on an endless belt, and along a bend-breaking line formed on the glass plate, while a glass-plate receiving device is moved below the endless belt in correspondence with the movement of the press-breaking device.

In the above-described glass-plate bend-breaking machine, since the placing of the glass plate on the endless belt is effected by a manual operation, in a case such as where a bend-breaking line (main cut line) has been formed in advance on the glass plate in a preceding process, unless the placing is effected by exercising precautions sufficiently, there is a possibility that the glass plate becomes bend-broken at the bend-breaking line, so that this operation entails an extreme danger.

In addition, with the above-described glass-plate bend-breaking machine, a multiplicity of openings are formed in a supporting plate for supporting the endless belt, and press-breaking devices and glass-plate receiving devices are arranged in correspondence with the multiplicity of openings, respectively, and bend-breaking is effected in an apportioned manner in each opening. Consequently, unless a bend-breaking line with a certain measure of depth has been formed, there is a possibility that bend-breaking cannot be effected completely at a position between adjacent openings.

The present invention has been devised in view of the above-described aspects, and its object is to provide a glass-plate bend-breaking machine which is capable of automatically placing the glass plate on a flexible member such as an endless belt without involving a manual operation, and which does not entail a danger in the bend-breaking operation of the glass plate.

Another object of the present invention is to provide a glass-plate bend-breaking machine which is capable of bend-breaking the glass plate reliably along a cut line without a bend-breaking error.

Still another object of the present invention is to provide a glass-plate bend-breaking machine in which even if a single or a small number of openings are provided in a supporting member for supporting the flexible member such as the endless belt, the flexible member is prevented from sagging much.

DISCLOSURE OF THE INVENTION

In accordance with the present invention, the above objects are attained by a machine for bend-breaking a glass plate comprising: a flexible member on which the glass plate is placed; a supporting member for supporting a peripheral portion of the flexible member; a glass plate receiving device disposed below the flexible member and including a glass plate receiving surface for receiving the glass plate from a lower surface of the glass plate by means of the flexible member in a region surrounded by the supporting member; a first moving device for moving the glass plate receiving surface of the glass plate receiving device within a plane, which is parallel to the surface of the glass plate; a press-breaking device disposed above the endless belt and including a pressing surface for press-breaking the glass plate which is placed on the flexible member and on which a cut line is formed, along the cut line, in the region surrounded by the supporting member; a second moving device for moving the pressing surface of the press-breaking device within a plane, which is parallel to the surface of the glass plate; and a carrying-in and carrying-out means for carrying the glass plate to be subjected to bend-breaking into the region surrounded by the supporting means and for carrying the glass plate subjected to bend-breaking out of the region surrounded by the supporting member, the first and second moving devices operating such that a moving position of the pressing surface corresponds to a moving position of the glass plate receiving surface in a press-breaking operation of the pressing surface of the press-breaking device for the glass plate above the endless belt in the region surrounded by the supporting member.

In accordance with the present invention, the above objects are also attained by a machine for bend-breaking a glass plate comprising: a flexible member on which the glass plate is placed; a supporting member for supporting a peripheral portion of the flexible member; a plurality of glass plate receiving devices each disposed below the flexible member and including a glass plate receiving surface for receiving the glass plate from a lower surface of the glass plate by means of the flexible member in a region surrounded by the supporting member; a plurality of first moving devices each for moving the glass plate receiving surface of the corresponding glass plate receiving device within a plane, which is parallel to the surface of the glass plate; a plurality of press-breaking devices each disposed above the endless belt and including a pressing surface for press-breaking the glass plate which is placed on the flexible member and on which a cut line is formed, along the cut line, in the region surrounded by the supporting member; a plurality of second moving devices each for moving the pressing surface of the corresponding press-breaking device within a plane, which is parallel to the surface of the glass plate; and a carrying-in and carrying-out means for carrying the glass plate to be subjected to bend-breaking into the region surrounded by the supporting means and for carrying the glass plate subjected to bend-breaking out of the region surrounded by the supporting member, the first and second moving devices each operating such that a moving position of the corresponding pressing surface corresponds to a moving position of the glass plate receiving surface in a press-breaking operation of the pressing surface of the corresponding press-breaking device for the glass plate above the endless belt in the region surrounded by the supporting member.

Further, according to the present invention, the above objects are also attained by a machine for bend-breaking a glass plate comprising: a flexible member on which the glass plate is placed; a supporting member for supporting the flexible member; a glass plate receiving device including a glass plate receiving surface for receiving the glass plate from a lower surface of the glass plate by means of the flexible member; a first moving device for moving the glass plate receiving surface of the glass plate receiving device; a press-breaking device including a pressing surface for press-breaking the glass plate; a second moving device for moving the pressing surface of the press-breaking device; and a carrying-in and carrying-out means for carrying the glass plate to be subjected to bend-breaking in and for carrying the glass plate subjected to bend-breaking out; the first and second moving devices operating such that a moving position of the pressing surface corresponds to a moving position of the glass plate receiving surface in a press-breaking operation of the pressing surface of the press-breaking device for the glass plate.

In one aspect of the present invention, the first moving device includes a moving mechanism for moving the glass plate receiving surface in one direction and in another direction intersecting with the one direction, within the plane, which is parallel to the surface of the glass plate, and in another aspect, the second moving device includes a moving mechanism for moving the pressing surface in one direction and in another direction intersecting with the one direction, within the plane, which is parallel to the surface of the glass plate.

In another aspect of the present invention, the glass plate receiving surface has a movable supporting surface capable of advancing and retracting with respect to the lower surface of the glass plate for supporting the glass plate by means of the endless belt, and the glass plate receiving device including an advancing/retracting means for advancing and retracting the movable supporting surface.

In still another aspect of the present invention, the glass plate receiving surface has a movable supporting surface capable of advancing and retracting with respect to the lower surface of the glass plate for supporting the glass plate by means of the endless belt, and a fixed supporting surface fixed with respect to its approaching and moving-away directions relative to the lower surface of the glass plate for supporting the glass plate by means of the endless belt, the glass plate receiving device having an advancing/retracting means for advancing and retracting the movable supporting surface.

In still another aspect of the present invention, the fixed supporting surface is disposed surrounded by the movable supporting surface.

In still another aspect of the present invention, the advancing/retracting means comprises a cylinder unit, the movable supporting surface being connected to a piston rod of the cylinder unit.

In still another aspect of the present invention, the glass plate receiving surface has a fixed supporting surface fixed with respect to its approaching and moving-away directions relative to the lower surface of the glass plate for supporting the glass plate by means of the endless belt.

In still another aspect of the present invention, the flexible member has an endless belt, the machine for bend-breaking a glass plate further comprising a means for imparting the tension to the endless belt.

In still another aspect of the present invention, the flexible member has an endless belt, the machine for bend-breaking a glass plate further comprising a traveling means for traveling the endless belt.

In still another aspect of the present invention, a machine for bend-breaking a glass plate further comprises other supporting mechanism for supporting the flexible member from the lower surface thereof in the region, preferably almost at the center of the region, surrounded by the supporting member.

In still another aspect of the present invention, the pressing surface has a planar surface, a cylindrical surface or a spherical surface for abutting on the surface of the glass plate to press-break the glass plate along a cut line.

As glass plates to be bend-broken by the bend-breaking machine of the present invention, it is possible to cite, by way of example, window glass for general structures, glass for furniture, and glass for automobiles, such as front glass, rear glass, and side glass, and the like, but other glass plates can be also included.

As the flexible member in the present invention, the aforementioned flexible endless belt, which is a flexible endless member, can be cited as a preferred example, but a flexible ended sheet may be alternatively used.

In the present invention, since the carrying-in and carrying-out means is provided, it is possible to provide a glass-plate bend-breaking machine which is capable of automatically placing the glass plate on the flexible member such as the endless belt without involving a manual operation, and which does not entail a danger in the bend-breaking operation of the glass plate.

In addition, in accordance with the present invention, since the supporting member supports a peripheral portion of the flexible member, it is possible to provide a glass-plate bend-breaking machine which is capable of bend-breaking the glass plate reliably along a cut line without a bend-breaking error.

Furthermore, in accordance with the present invention, since appropriate tension can be imparted to the flexible member, it is possible to provide a glass-plate bend-breaking machine in which the flexible member is prevented from sagging much.

In addition, in accordance with the present invention, since the glass-plate receiving surface is fixed with respect to its approaching and moving-away directions relative to the lower surface of the glass plate, and has a fixed supporting surface for supporting the glass plate by means of the endless belt, a step can be suitably formed in the press-breaking of the glass plate, and the glass plate can be reliably bend-broken without a bend-breaking error.

Hereafter, a description will be given of the present invention with reference to the embodiment shown in the drawings. The above-described aspects and other aspects of the present invention will become apparent therefrom. It should be noted that the present invention is not limited to the embodiment.

EMBODIMENT

In FIGS. 1 to 9, a glass-plate bend-breaking machine 1 in accordance with this embodiment comprises: a flexible endless belt 3 serving as a flexible member on which a glass plate 2 is placed; a supporting member 4 supporting a peripheral portion of an upper-side portion of the endless belt 3 from its lower surface side; a plurality of, in this embodiment two, glass-plate receiving devices 7 and 7a which respectively have glass-plate receiving surfaces 6 and 6a for receiving from a lower surface side of the glass plate 2 the glass plate 2 by means of the endless belt 3 inside a region 5 surrounded by the supporting member 4, and which are disposed below the upper-side portion of the endless belt 3; moving devices 8 and 8a for moving the respective glass-plate receiving surfaces 6 and 6a of the glass-plate receiving devices 7 and 7a in an X direction, which is one direction within a plane parallel to the surface of the glass plate 2, i.e., within a horizontal plane in this embodiment, and in another direction perpendicular to the X direction, i.e., in a Y direction perpendicular to the X direction in this embodiment; a plurality of, in this embodiment two, press-breaking devices 9 and 9a disposed above the upper side portion of the endless belt 3; moving devices 10 and 10a for moving the respective press-breaking devices 9 and 9a in the X direction, which is one direction within the horizontal plane and in another direction perpendicular to the X direction, i.e., in the Y direction perpendicular to the X direction in this embodiment; a carrying-in and carrying-out means 11 for carrying the glass plate 2 to be subjected to bend-breaking into the region 5 surrounded by the supporting member 4, and for carrying the glass plate 2 subjected to bend-breaking out of the region 5 surrounded by the supporting member 4; a tension imparting means 12 for imparting tension to the endless belt 3; a traveling device 13 for causing the endless belt 3 to travel in an A direction in the X direction; a supporting mechanism 15 for supporting the upper-side portion of the endless belt 3, preferably the lower surface of a substantially central portion of that upper-side portion; and a frame 16.

Both glass-plate receiving devices 7 and 7a, both moving devices 8 and 8a, both press-breaking devices 9 and 9a, and both moving devices 10 and 10a are respectively constructed identically, a description will be given below of only the glass-plate receiving device 7, the moving device 8, the press-breaking device 9, and the moving device 10 except for especially necessary cases, and corresponding devices will be only illustrated by attaching b to the same reference numerals.

The endless belt 3 is trained around a driving drum 17, a driven drum 18, and freely rotating drums 19 and 20.

The supporting member 4 formed of a hollow rectangular member is supported by a base 23 of the frame 16 by means of a bracket 21 and an intermediate base 22 of the frame 16. The supporting member 4 may be formed of a plate-shaped member instead of the hollow rectangular member. In short, it suffices if the supporting member 4 is capable of supporting the upper-side portion of the endless belt 3 from its lower surface side and of ensuring that the upper-side portion of the endless belt 3 does not sag to an extremely degree. Therefore, the supporting member 4 may be omitted insofar as tension can be imparted to the endless belt 3 in a desired manner to ensure that the upper-side portion of the endless belt 3 does not sag to an extremely degree. In addition, if the driving drum 17 and the driven drum 18 are provided as in this embodiment, the driving drum 17 and the driven drum 18 may be made to function as parts of the supporting member 4, and portions in the supporting member 4 which extend in parallel to the driving drum 17 and the driven drum 18 may be omitted.

Figure 1:
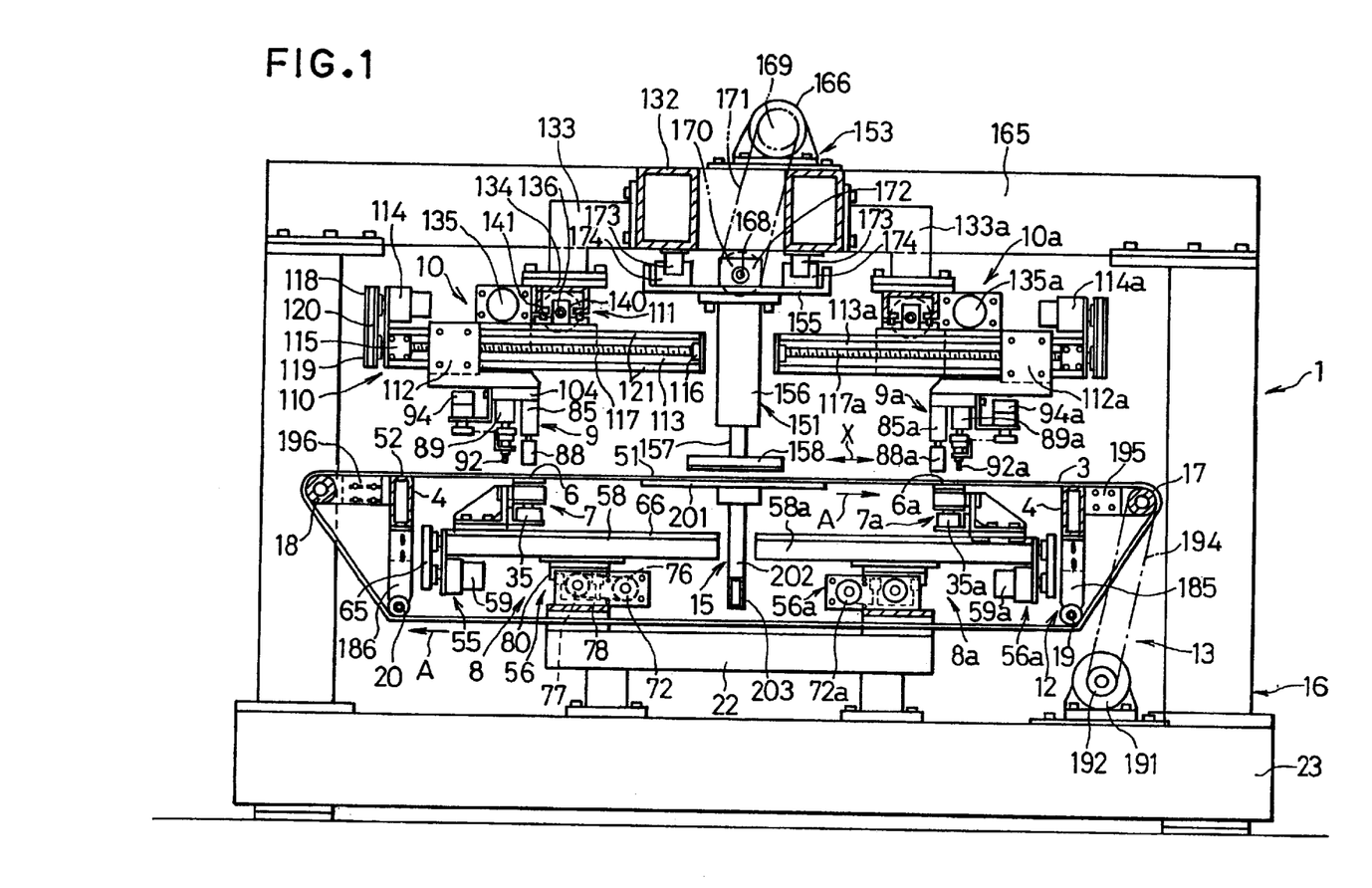
FIG. 1 is a side elevational view of a preferred embodiment of the present invention.
Figure 2:
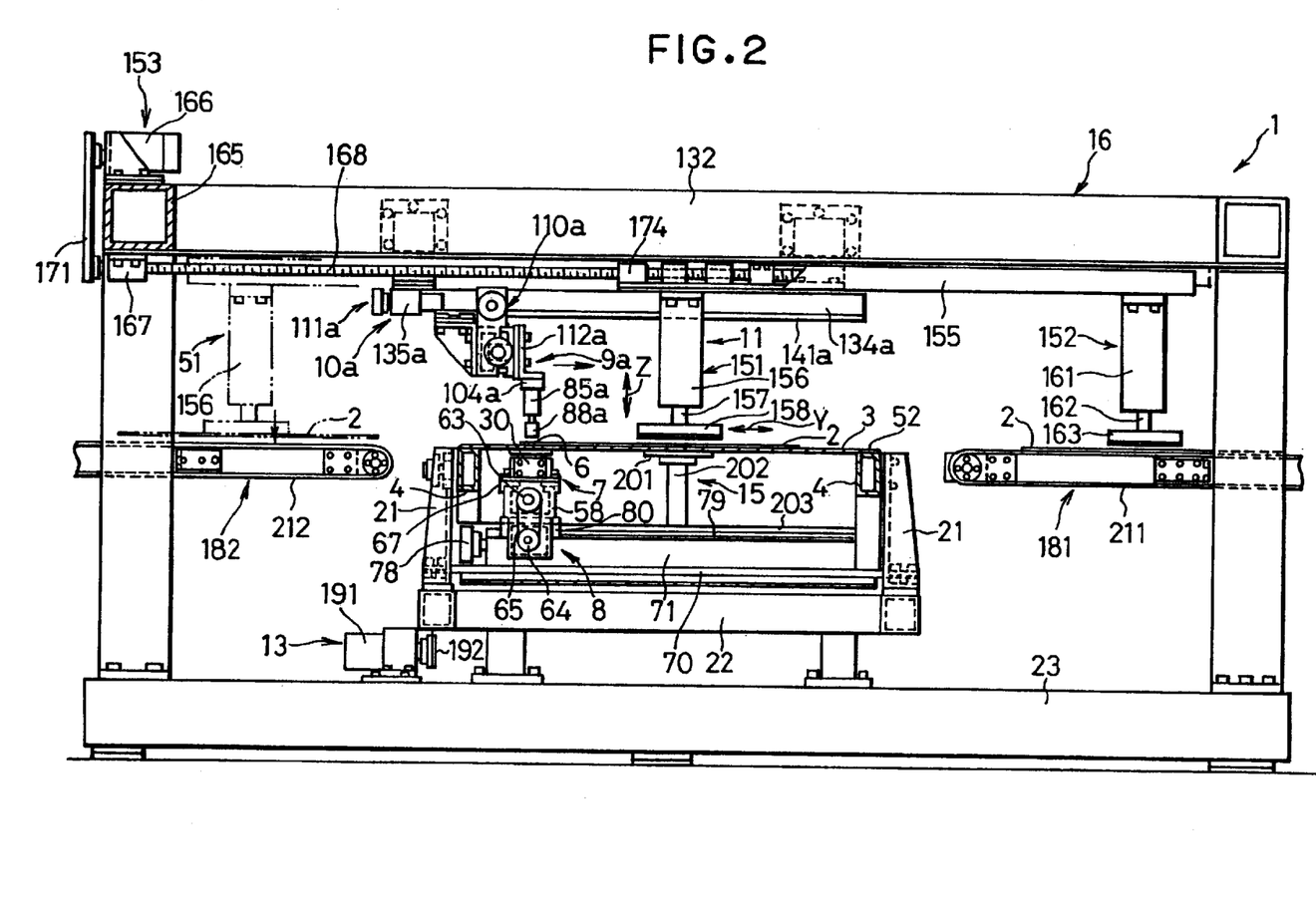
FIG. 2 is a front elevational view of the embodiment shown in FIG. 1.
Figure 3:
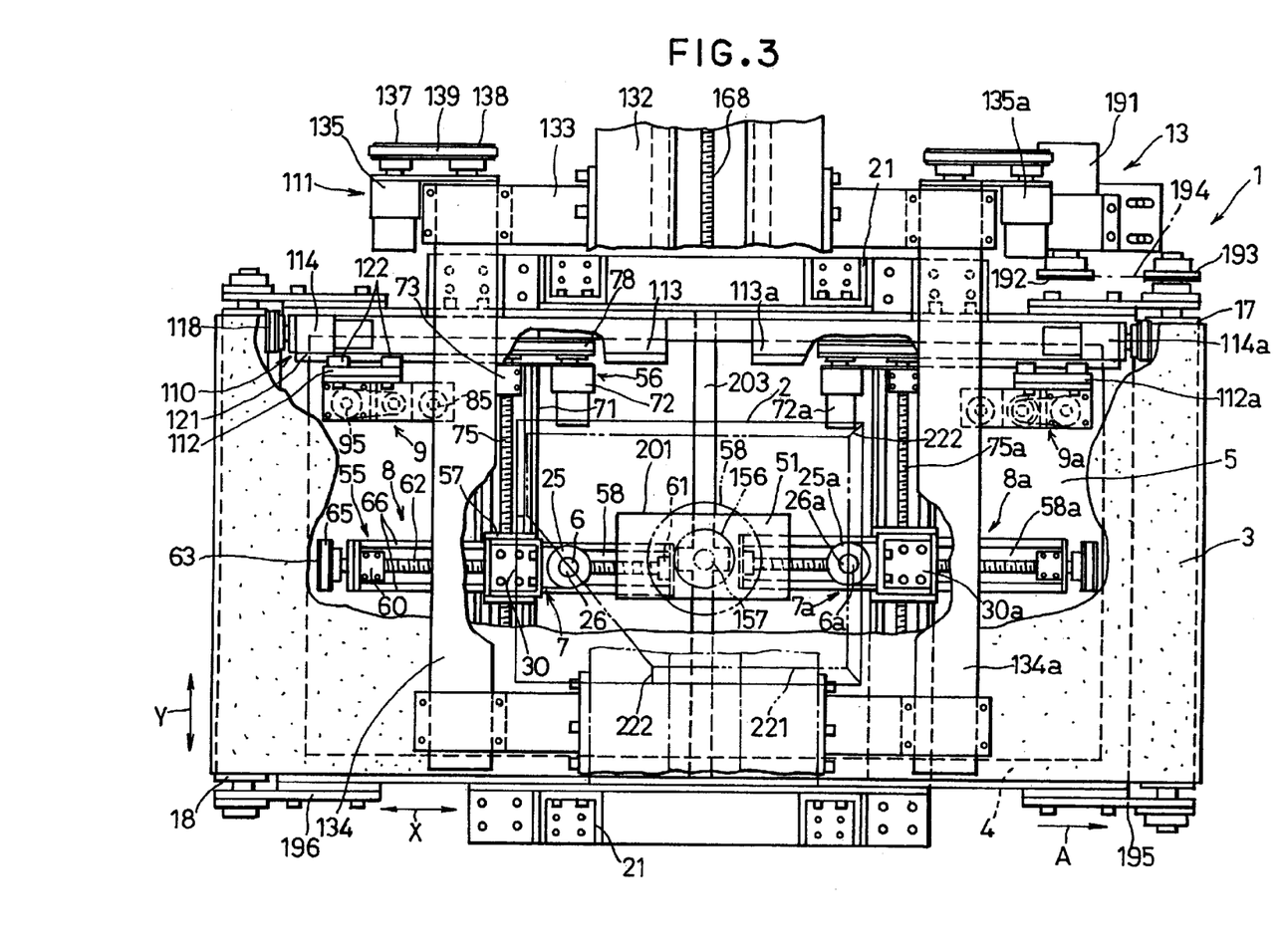
FIG. 3 is a plan view in which an endless belt, a supporting member, and the like are partly broken away in the embodiment shown in FIG. 1.
Figure 4:
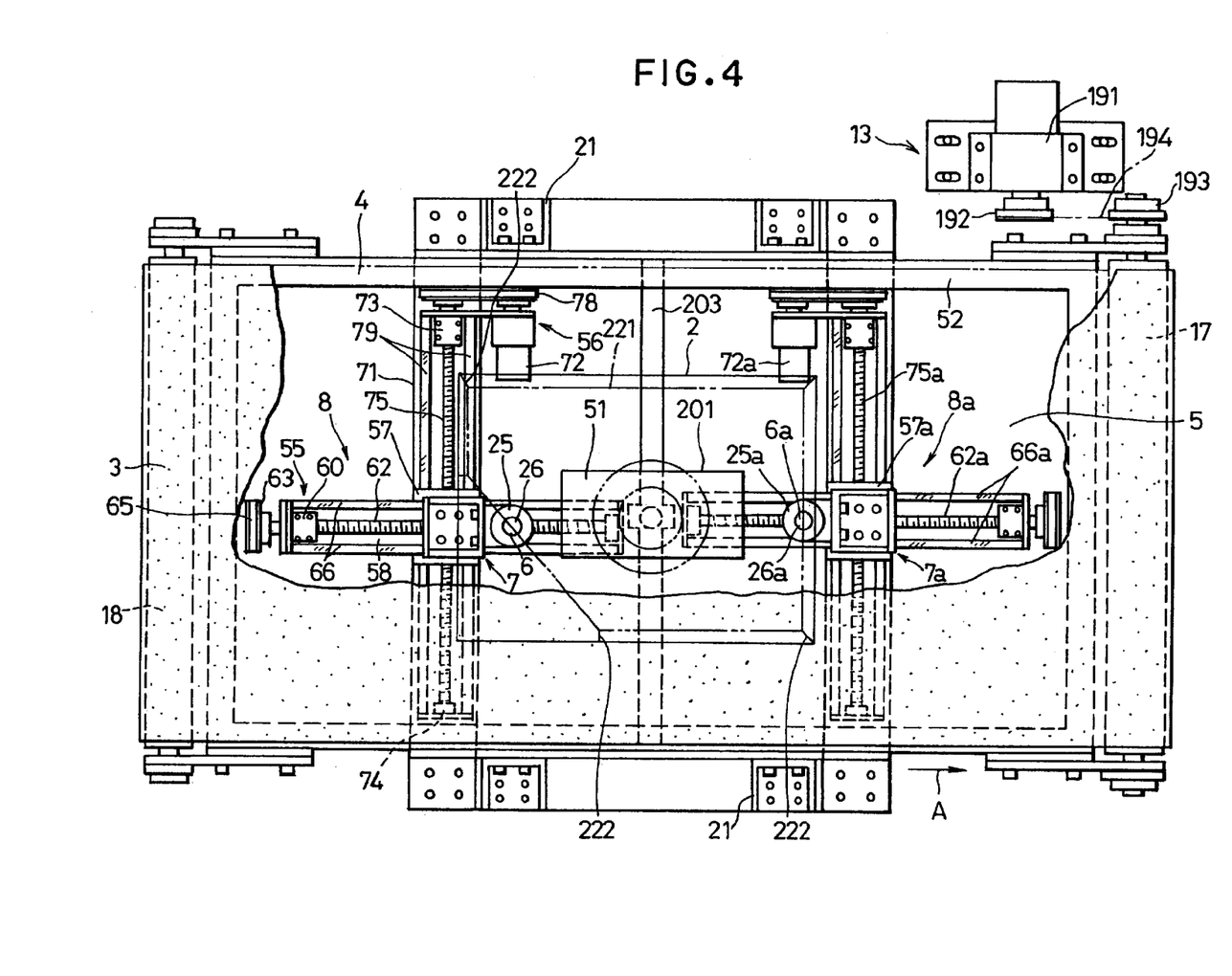
FIG. 4 is a plan view in which the endless belt and the like are partly broken away in the embodiment shown in FIG. 1.
Figure 5:
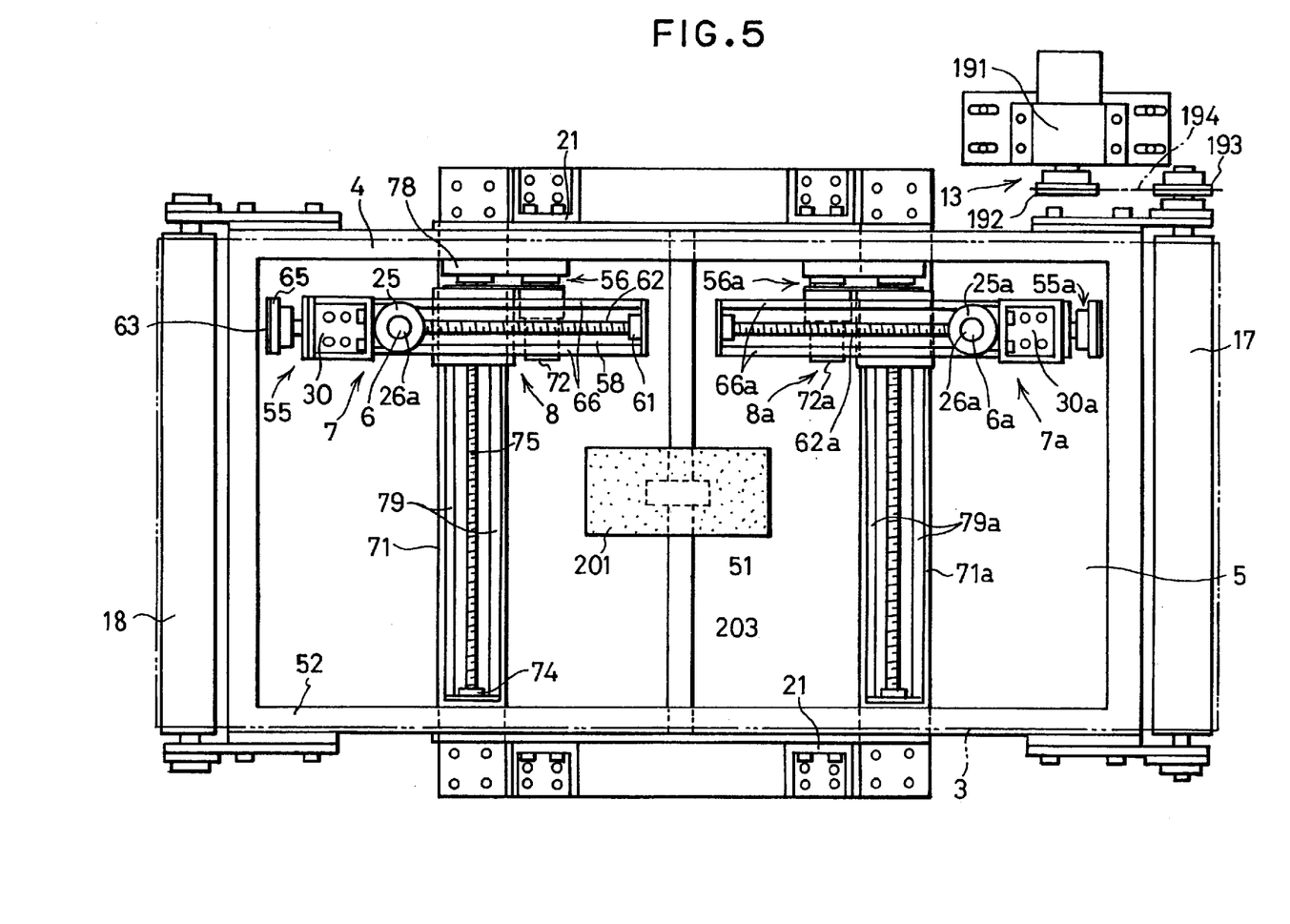
FIG. 5 is a plan view in which the endless belt is omitted in the embodiment shown in FIG. 1.
Figure 6:
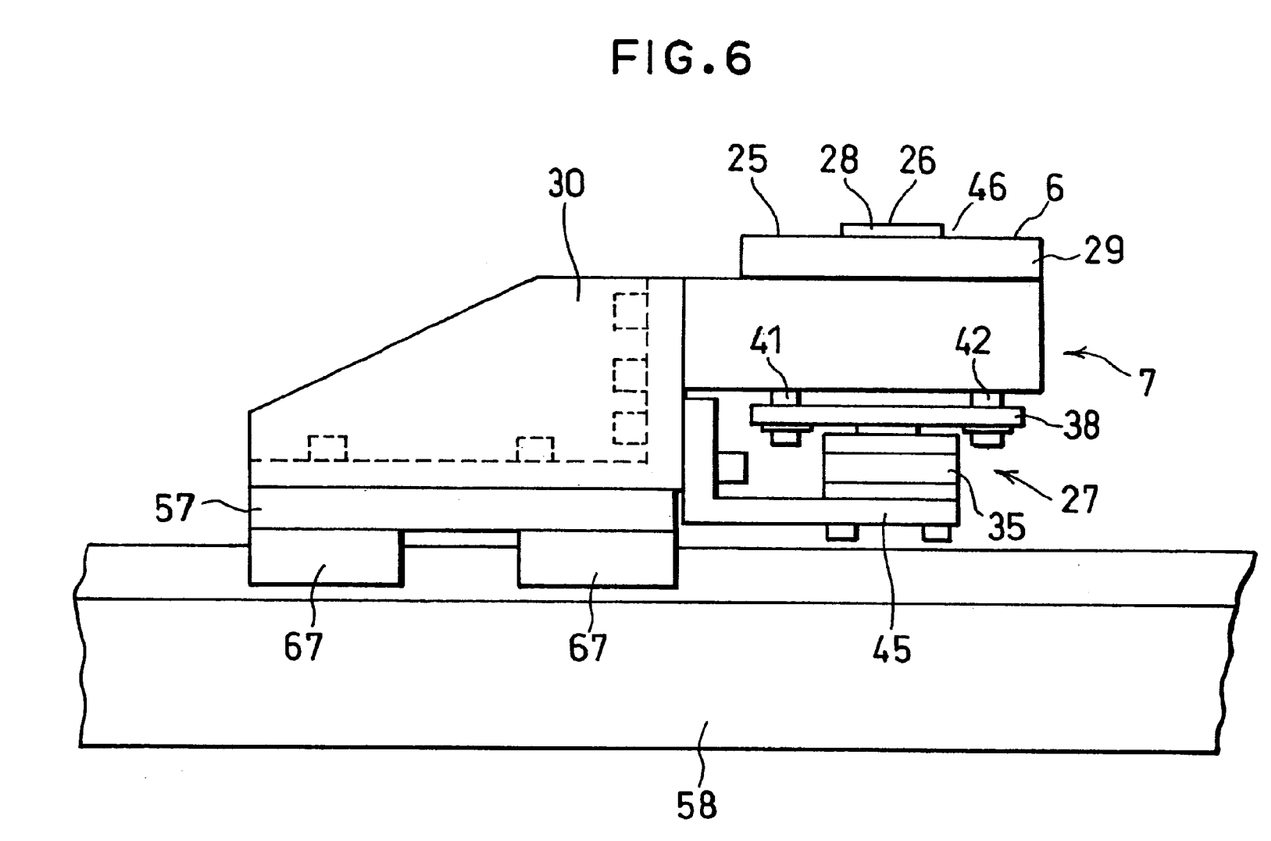
FIG. 6 is a detailed side elevational view of a glass-plate receiving device in a case where a movable surface has been lowered in the embodiment shown in FIG. 1.
Figure 7:
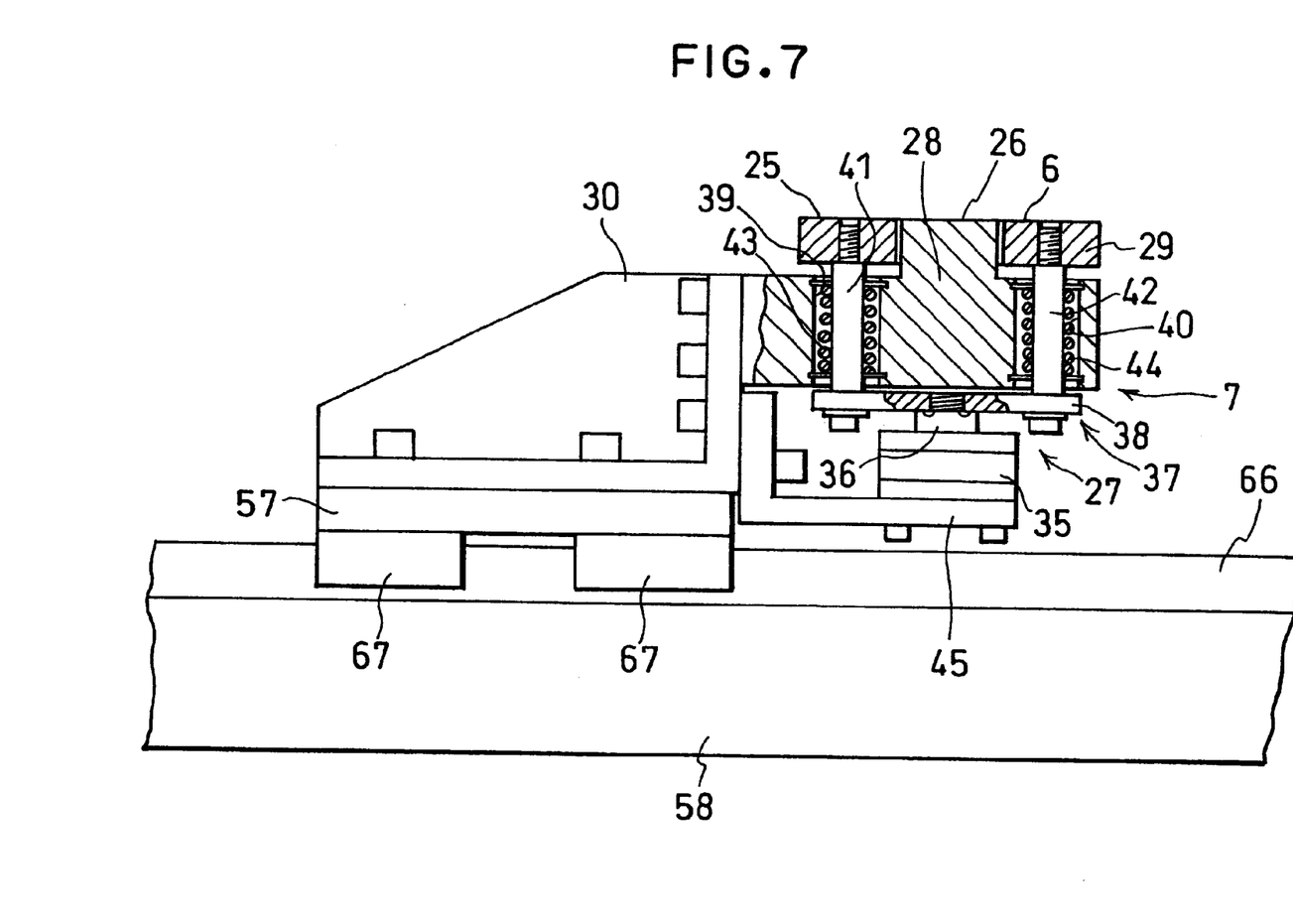
FIG. 7 is a detailed side elevational view of the glass-plate receiving device in a case where the movable surface has been raised in the embodiment shown in FIG. 1.
Figure 8:
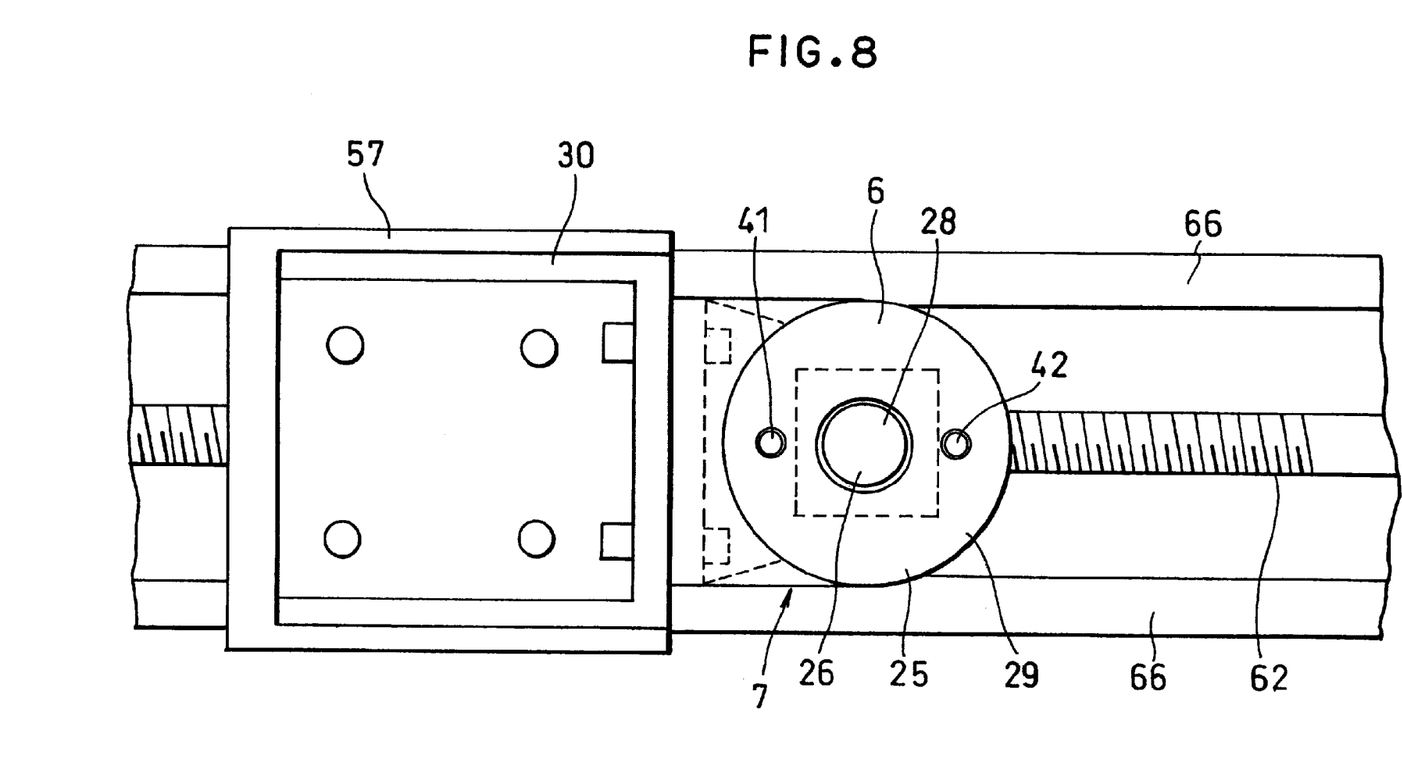
FIG. 8 is a detailed plan view of the glass-plate receiving device in the embodiment shown in FIG. 1.

The glass-plate receiving surface 6 includes a movable supporting surface 25 which is capable of advancing and retracting with respect to the lower surface of the glass plate 2 and supports the glass plate 2 by means of the upper-side portion of the endless belt 3, as well as a fixed supporting surface 26 which is fixed with respect to the directions in which it approaches and moves away from the lower surface of the glass plate 2 and supports the glass plate 2 by means of the upper-side portion of the endless belt 3. The fixed supporting surface 26 which is circular is disposed in such a manner as to be surrounded by the movable supporting surface 25 which is annular.

The glass-plate receiving device 7 includes: an advancing/retracting means 27 for advancing and retracting the movable supporting surface 25 with respect to the lower surface of the glass plate 2; a fixed receiving member 28 having the fixed supporting surface 26 formed on one end surface thereof; an annular movable receiving member 29 having the movable supporting surface 25 formed on one end surface thereof; and a base 30 on which the advancing/retracting means 27 and the fixed supporting surface 26 are mounted.

The advancing/retracting means 27 includes a cylinder unit 35 and a connecting mechanism 37 for connecting together a piston rod 36 of the cylinder unit 35 and the movable receiving member 29. The connecting mechanism 37 includes: a disk member 38 to which one end of the piston rod 36 is threadedly secured; connecting rod members 41 and 42 each having one end secured to the disk member 38 and the other end secured to the movable receiving member 29, the connecting rod members 41 and 42 being disposed by passing through through holes 39 and 40 in the fixed receiving member 28; linear ball bearings 43 and 44 having a multiplicity of steel balls for supporting the respective connecting rod members 41 and 42 to allow the connecting rod members 41 and 42 to be vertically movable in the respective through holes 39 and 40; and a bracket 45 for mounting the cylinder unit 35 on the base 30. The movable supporting surface 25 is thus connected to the piston rod 36 of the cylinder unit 35 by means of the connecting mechanism 37.

The cylinder unit 35 is constituted by a pneumatic or air cylinder, but may be alternatively constituted by a liquid-pressure or hydraulic cylinder. The cylinder unit 35, which, during the formation of a cut line, raises the movable supporting surface 25 flush with the movable supporting surface 25 and which, during the formation of push-breaking, lowers the movable supporting surface 25 to be positioned slightly lower than the fixed supporting surface 26 with a step 46 formed with respect to the movable supporting surface 25, is preferably constituted by an air cylinder for the purpose of supporting the glass plate 2 pneumatically resiliently by the movable supporting surface 25, but is preferably constituted by a hydraulic cylinder for the purpose of supporting the glass plate 2 rigidly in the same way as the fixed supporting surface 26.

The fixed supporting surface 26 is disposed in parallel with both an upper surface 51 of the supporting mechanism 15 and an upper surface 52 of the supporting member 4, preferably at the same height as these surfaces or higher than the same by 1 mm to 2 mm or thereabouts, whereas the movable supporting surface 25 at its most lowered position is preferably disposed lower than the fixed supporting surface 26 by 1 mm to 2 mm or thereabouts, or may be further lower than that level. It should be noted that the movable supporting surface 25, instead of being made movable, may be disposed fixedly in the same way as the fixed supporting surface 26 by forming the step 46 around the fixed supporting surface 26. Furthermore, without especially providing the supporting surface 25, whether it be movable or fixed, the space around the fixed supporting surface 26 may be used as the step.

The moving device 8 is constituted by an X-direction moving mechanism 55 and a Y-direction moving mechanism 56.

The X-direction moving mechanism 55 includes: an X-direction linearly moving base 57 on which the base 30 of the glass-plate receiving device 7 is mounted; an electric motor 59 attached to a horizontal member 58; a threaded shaft 62 supported rotatably by the horizontal member 58 by means of bearings 60 and 61; pulleys 63 and 64, which are respectively secured to an output rotating shaft of the motor 59 and one end of the threaded shaft 62, as well as a belt 65 trained between the pulleys 63 and 64, so as to transmit the rotation of the output rotating shaft of the motor 59 to the threaded shaft 62; a nut (not shown) threadedly engaged with the threaded shaft 62 and secured by being fixed to a lower surface of the linearly moving base 57; a pair of rails 66 formed on the horizontal member 58; and a slider 67 fitted slidably to the pair of rails 66 and secured by being attached to the lower surface of the linearly moving base 57.

The linearly moving base 57 is adapted to move linearly in the X direction while being guided by the pair of rails 66 when the threaded shaft 62 is rotated by means of the pulleys 63 and 64 and the belt 65 as the motor 59 is operated to rotate its output rotating shaft.

The Y-direction moving mechanism 56 is constructed in substantially the same way as the X-direction moving mechanism 55, and includes: the aforementioned horizontal member 58 serving as a Y-direction linearly moving base; a horizontal member 71 fixedly mounted on top of the intermediate base 22 by means of a supporting member 70, the bracket 21, and the like; an electric motor 72 attached to the horizontal member 71; a threaded shaft 75 supported rotatably by the horizontal member 71 by means of bearings 73 and 74; pulleys 76 and 77, which are respectively secured to an output rotating shaft of the motor 72 and one end of the threaded shaft 75, as well as a belt 78 trained between the pulleys 76 and 77, so as to transmit the rotation of the output rotating shaft of the motor 72 to the threaded shaft 75; a nut (not shown) threadedly engaged with the threaded shaft 75 and secured by being fixed to a lower surface of the horizontal member 58; a pair of rails 79 formed on the horizontal member 71; and a slider 80 fitted slidably to the pair of rails 79 and secured by being attached to the lower surface of the horizontal member 58.

The horizontal member 58 is adapted to move linearly in the Y direction while being guided by the pair of rails 79 when the threaded shaft 75 is rotated by means of the pulleys 76 and 77 and the belt 78 as the motor 72 is operated to rotate its output rotating shaft. In addition, as the horizontal member 58 is moved linearly in the Y direction, the linearly moving base 57 is similarly moved linearly in the Y direction.

Figure 9:
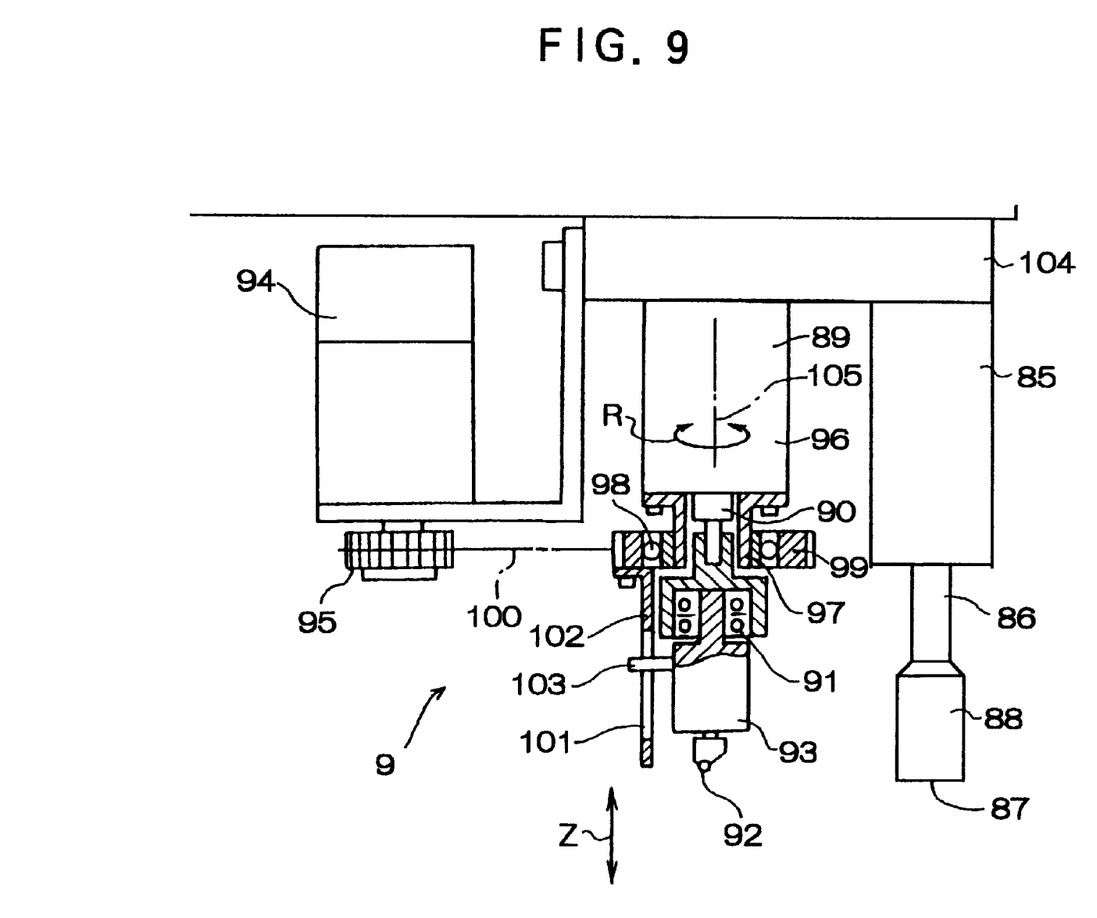
FIG. 9 is a detailed side elevational view of a press-breaking device in the embodiment shown in FIG. 1.

The press-breaking device 9 includes: an air cylinder unit 85; a push rod 88 attached to a piston rod 86 of the air cylinder unit 85 and having a flat pushing surface 87 on its lower surface; an air cylinder unit 89; a cutter block 93 attached to a piston rod 90 of the air cylinder unit 89 by means of a bearing mechanism 91 and having a cutter wheel 92 at its tip; an electric motor 94; a pulley or gear 95 attached to an output rotating shaft of the motor 94; a bearing mechanism 98 attached to a cylinder tube 96 of the air cylinder unit 89 by means of a bracket 97; a pulley or gear 99 attached to the bearing mechanism 98; a timing belt or chain 100 trained between the gear 95 and the gear 99; an engaging member 102 which is attached to the gear 99 and in which a slit 101 is formed; an engaging piece 103 having one end portion disposed in the slit 101 and the other end portion attached to the cutter block 93; and a base 104 on which the air cylinder units 85 and 89 and the electric motor 94 are mounted.

In the press-breaking device 9, as the air cylinder unit 85 is actuated to extend or retract the piston rod 86, the push rod 88 is moved in the vertical direction, i.e., in a Z direction; as the air cylinder unit 89 is actuated to extend or retract the piston rod 90, the cutter wheel 92 is moved in the Z direction; and as the gear 95 is rotated by the operation of the motor 94 to rotate the gear 99 by means of the chain 100, both the engaging member 102 and the engaging piece 103 engaging therewith at its slit 101 are rotated about an axis 105 in an R direction. The cutter wheel 92 is similarly rotated about the axis 105 in the R direction by this rotation, and its edge is directed in the direction in which a cut line is formed.

The moving device 10 is constituted by an X-direction moving mechanism 110 and a Y-direction moving mechanism 111.

The X-direction moving mechanism 110 includes: an X-direction linearly moving base 112 on which the base 104 of the press-breaking device 9 is mounted; an electric motor 114 attached to a horizontal member 113; a threaded shaft 117 supported rotatably by the horizontal member 113 by means of bearings 115 and 116; pulleys 118 and 119, which are respectively secured to an output rotating shaft of the motor 114 and one end of the threaded shaft 117, as well as a belt 120 trained between the pulleys 118 and 119, so as to transmit the rotation of the output rotating shaft of the motor 114 to the threaded shaft 117; a nut (not shown) threadedly engaged with the threaded shaft 117 and secured by being fixed to a lower surface of the linearly moving base 112; a pair of rails 121 formed on the horizontal member 113; and a slider 122 fitted slidably to the pair of rails 121 and secured by being attached to the lower surface of the linearly moving base 112.

The linearly moving base 112 is adapted to move linearly in the X direction while being guided by the pair of rails 121 when the threaded shaft 117 is rotated by means of the pulleys 118 and 119 and the belt 120 as the motor 114 is operated to rotate its output rotating shaft.

The Y-direction moving mechanism 111 is constructed in substantially the same way as the X-direction moving mechanism 110, and includes: the aforementioned horizontal member 113 serving as a Y-direction linearly moving base; a horizontal member 134 fixedly mounted on an upper frame 132 of the frame 16 by means of a bracket 133 and the like; an electric motor 135 attached to the horizontal member 134; a threaded shaft 136 supported rotatably by the horizontal member 134 by means of bearings (not shown); pulleys 137 and 138, which are respectively secured to an output rotating shaft of the motor 135 and one end of the threaded shaft 136, as well as a belt 139 trained between the pulleys 137 and 138, so as to transmit the rotation of the output rotating shaft of the motor 135 to the threaded shaft 136; a nut 140 threadedly engaged with the threaded shaft 136 and secured by being fixed to the upper surface of the horizontal member 113; a pair of rails 141 laid on the horizontal member 134; and a slider (not shown) fitted slidably to the pair of rails 141 and secured by being attached to the upper surface of the horizontal member 113. The horizontal member 113 is suspended from and supported by means of the slider in such a manner as to be movable in the Y direction.

The horizontal member 113 is adapted to move linearly in the Y direction while being guided by the pair of rails 141 when the threaded shaft 136 is rotated by means of the pulleys 137 and 138 and the belt 139 as the motor 135 is operated to rotate its output rotating shaft. In addition, as the horizontal member 113 is moved linearly in the Y direction, the linearly moving base 112 is similarly moved linearly in the Y direction.

The carrying-in and carrying-out means 11 includes: a lifting mechanism 151 for lifting up the glass plate 2 which is placed on the belt 3 and for which bend-breaking has been completed, and for clamping the glass plate 2, which is placed on the belt 3, in cooperation with the supporting mechanism 15 with the belt 3 interposed therebetween so as to fix the glass plate 2 onto the belt 3 during bend-breaking; a lifting mechanism 152 for placing the glass plate to be bend-broken onto the belt 3; and a reciprocating mechanism 153 for reciprocating the pair of lifting devices 151 and 152 in the Y direction.

The lifting mechanism 151 has an air cylinder unit 156 mounted on a movable base 155 as well as a vacuum suction device 158 attached to a distal end of a piston rod 157 of the air cylinder unit 156. As the air cylinder unit 156 is actuated to extend or retract its piston rod 157 in the Z direction, the vacuum suction device 158 lifts up the glass plate 2 placed on the belt 3, or clamps the glass plate 2, which is placed on the belt 3, in cooperation with the supporting mechanism 15 with the belt 3 interposed therebetween so as to fix the glass plate 2 onto the belt 3.

The lifting mechanism 152 is formed in the same way as the lifting mechanism 151, and has an air cylinder unit 161 mounted on the movable base 155 common to the lifting mechanism 151 as well as a vacuum suction device 163 attached to a distal end of a piston rod 162 of the air cylinder unit 161. As the air cylinder unit 161 is actuated to lower its piston rod 162 in the Z direction, the vacuum suction device 163 places the glass plate 2, which is being sucked, onto the belt 3.

The reciprocating mechanism 153 includes: the aforementioned movable base 155; an electric motor 166 attached to an upper frame 165 of the frame 16; a threaded shaft 168 supported rotatably by the upper frame 132 of the frame 16 by means of a bearing 167; pulleys 169 and 170, which are respectively secured to an output rotating shaft of the motor 166 and one end of the threaded shaft 168, as well as a belt 171 trained between the pulleys 169 and 170, so as to transmit the rotation of the output rotating shaft of the motor 166 to the threaded shaft 168; a nut 172 threadedly engaged with the threaded shaft 168 and secured by being fixed to the upper surface of the movable base 155; a pair of rails 173 formed on the frame 132; and a slider 174 fitted slidably to the pair of rails 173 and secured by being attached to the upper surface of the movable base 155. The movable base 155 is suspended from and supported by the upper frame 132 by means of the slider 174 in such a manner as to be movable in the Y direction.

The movable base 155 is adapted to reciprocate linearly in the Y direction while being guided by the pair of rails 173 when the threaded shaft 168 is rotated by means of the pulleys 169 and 170 and the belt 171 as the motor 166 is operated to rotate its output rotating shaft.

As the reciprocating mechanism 153 is operated, the carrying-in and carrying-out means 11 causes the lifting devices 151 and 152 to reciprocate linearly in the Y direction. In this linear reciprocating motion, the lifting device 152 lifts up the glass plate 2 to be subjected to bend-breaking and placed on a conveying device 181 on the entrance side, carries it into the region 5 surrounded by the supporting member 4, and places it on the upper surface of the upper-side portion of the endless belt 3, whereas the lifting device 151 carries the glass plate 2, subjected to bend-breaking and placed on the upper surface of the upper-side portion of the endless belt 3, out of the region 5 surrounded by the supporting member 4, and places it on a conveying device 182 on the exit side.

The tension imparting means 12 has a pair of air cylinder units 185 and 186 supported by the bracket 21, and the piston rod of the air cylinder unit 185 rotatably supports the freely rotating drum 19, while the piston rod of the air cylinder unit 186 rotatably supports the freely rotating drum 20.

The tension imparting means 12 imparts tension to the endless belt 3 by means of the freely rotating drums 19 and 20 through the pneumatic resiliency of the air cylinder units 185 and 186, thereby tensioning the endless belt 3. The tension imparting means 12 may not be provided if the endless belt 3 can be tensioned as desired by the positional adjustment of the driving drum 17, the driven drum 18, and the freely rotating drums 19 and 20.

The traveling device 13 includes an electric motor 191 mounted on the base 23; the aforementioned driving drum 17 and driven drum 18; the freely rotating drums 19 and 20; and pulleys 192 and 193, which are respectively secured to an output rotating shaft of the electric motor 191 and a rotating shaft of the driving drum 17, as well as a belt 194 trained between the pulleys 192 and 193, so as to transmit the rotation of the output rotating shaft of the electric motor 191 to the rotating shaft of the driving drum 17. The driving drum 17 and the driven drum 18 are respectively attached rotatably to frames 195 and 196 which are supported by the intermediate base 22.

As the motor 191 is operated to rotate its output rotating shaft, the traveling device 13 rotates the driving drum 17 by means of the pulley 192, the belt 194, and the pulley 193. As the driving drum 17 is rotated, the belt 3 is made to travel in, for example, the A direction, thereby allowing the belt 3 to convey cullet, obtained by bend-breaking on the belt 3, in the A direction and discharge the same.

The supporting mechanism 15 has a rectangular receiving plate 201 and a column 202 for supporting the receiving plate 201, and the column 202 is supported by the bracket 21 by means of a horizontal member 203.

The supporting mechanism 15 supports from below the glass plate 2, which is placed on the endless belt 3, by means of the endless belt 3 on the upper surface 51 of the receiving plate 201, and clamps the glass plate 2 in cooperation with the vacuum suction device 158 so as to fix it onto the belt 3.

The conveying device 181 on the entrance side has an endless belt 211 on which the glass plate 2 to be bend-broken is placed, as well as a traveling device (not shown) for causing the endless belt 211 to travel. The conveying device 181 accurately carries in the glass plate 2 to be bend-broken to a predetermined position through the traveling of the endless belt 211 based on the operation of the traveling device.

The conveying device 182 on the exit side has an endless belt 212 on which the glass plate 2 subjected to bend-breaking is placed, as well as a traveling device (not shown) for causing the endless belt 212 to travel. The conveying device 182 conveys the glass plate 2 subjected to bend-breaking, to an ensuing working process, e.g., a process for grinding and polishing bent-broken edges, through the traveling of the endless belt 212 based on the operation of the traveling device.

The glass-plate bend-breaking machine 1 further comprises a controller including a microcomputer and the like, and the controller controls the operation of the motors, the cylinder units, the vacuum suction devices, and the like through numerical control commands programmed in advance. Since such a controller itself is publicly known, and a detailed description thereof will be omitted.

The glass-plate bend-breaking machine 1 performs the bend-breaking operation with respect to the glass plate 2 in the following manner.

First, the glass plate 2 with predetermined bend-breaking lines (main cut lines) 221 marked thereon is disposed in an accurate position by the endless belt 211. Incidentally, such bend-breaking lines 221 may be formed by the glass-plate bend-breaking machine 1 of this embodiment.

Upon completion of one bend-breaking, the respective vacuum suction devices 158 and 163 which have already been lowered by the actuation of the air cylinder units 156 and 161 are operated, and the already bend-broken glass plate 2 on the endless belt 3 is sucked by the vacuum suction device 158, while the glass plate 2 which is to be bend-broken next and placed on the endless belt 211 is sucked by the vacuum suction device 163. Subsequently, the air cylinder units 156 and 161 are operated, and the already bend-broken glass plate 2 on the endless belt 3 is lifted up by the vacuum suction device 158, while the glass plate 2 which is to be bend-broken and placed on the endless belt 211 is lifted up by the vacuum suction device 163.

After lifting up, the electric motor 166 of the reciprocating mechanism 153 is operated to reciprocate the movable base 155, and the already bend-broken glass plate 2 lifted up by the vacuum suction device 158 is carried onto the endless belt 212 out of the region 5 surrounded by the supporting member 4, while the glass plate 2 which is to be bend-broken from now and lifted up by the vacuum suction device 163 is carried onto the endless belt 3 and into the region 5 surrounded by the supporting member 4.

During this carrying-out and carrying-in operation, when the motor 191 is operated to cause the endless belt 3 to travel in the A direction in the state in which the glass plate 2 is lifted up, the bent-broken cullet remaining on the upper-side portion of the endless belt 3 is conveyed in the A direction in conjunction with the traveling of the endless belt 3, and is discharged. After the discharge of the cullet, the operation of the motor 191 is stopped to stop the traveling of the endless belt 3 in the A direction.

After carrying-in and carrying-out, the air cylinder units 156 and 161 are actuated again to lower the vacuum suction devices 158 and 163. After the vacuum suction devices 158 and 163 are lowered to predetermined positions, the sucking operation of the vacuum suction devices 158 and 163 is stopped, and the bent-broken glass plate 2 is placed on the endless belt 212 by the vacuum suction device 158, while the glass plate 2 to be bend-broken from now is placed on the endless belt 3 by the vacuum suction device 163. Subsequently, the air cylinder units 156 and 161 are reversely actuated to raise the vacuum suction devices 158 and 163. Further, the electric motor 166 of the reciprocating mechanism 153 is reversely operated to cause the movable base 155 to undergo returning motion, and the vacuum suction device 163 is moved to above the endless belt 211, while the vacuum suction device 158 is moved to above the endless belt 3.

During the reciprocating motion of the vacuum suction devices 158 and 163, the glass plate 2 to be bend-broken next is carried in to the predetermined position by the operation of the endless belt 211.

Upon return of the vacuum suction devices 158 and 163 to their original positions, the air cylinder units 156 and 161 are actuated again to lower the vacuum suction devices 158 and 163. After the vacuum suction devices 158 and 163 are lowered to their predetermined positions, the glass plate 2 placed on the upper-side portion of the endless belt 3 by the vacuum suction device 158 is pressed against the endless belt 3 by means of the pneumatic resiliency based on the air cylinder unit 156, while the glass plate 2 placed on the endless belt 211 by the vacuum suction device 163 is pressed against the endless belt 211 by means of the pneumatic resiliency based on the air cylinder unit 161.

As a result, the glass plate 2 placed on the upper-side portion of the endless belt 3 is clamped by the vacuum suction device 158 and the receiving plate 201 with the endless belt 3 interposed between glass plate 2 and the receiving plate 201, and is securely held and fixed on the upper-side portion of the endless belt 3.

Subsequently, the motors 59 and 59a as well as 72 and 72a are operated to move the glass-plate receiving devices 7 and 7a in the X and Y directions, so that the glass receiving surfaces 6 and 6a will be disposed below the cutter wheels 92 and 92a. At the same time, the motors 114 and 114a as well as 135 and 135a are operated to move the press-breaking devices 9 and 9a in the X and Y directions, so that the cutter wheels 92 and 92a are moved in the radial direction with the predetermined bend-breaking lines 221 set as starting points. When the cutter wheels 92 and 92a are moved from the predetermined bend-breaking lines 221, the air cylinder units 89 and 89a are concurrently actuated to cause the cutter wheels 92 and 92a to abut against the glass plate 2, thereby forming end cut lines (auxiliary cut lines) 222 on the glass plate 2 by means of the cutter wheels 92 and 92a.

During the formation of the end cut lines 222, the motors 94 and 94a are operated to cause the edges of the cutter wheels 92 and 92a to be directed in the direction in which the end cut lines are formed. In addition, during the formation of the end cut lines, the push rods 88 and 88a remain raised without coming into contact with the glass plate 2.

After one end cut line 222 is thus formed, the press-breaking devices 9 and 9a and the glass-plate receiving devices 7 and 7a are moved to ensuing end-cut-line forming positions, and the cutter wheels 92 and 92a respectively effect the end-cut-line formation within the region 5. During the end-cut-line formation, the glass-plate receiving devices 7 and 7a are moved in correspondence with the movement of the cutter wheels 92 and 92a so that the fixed supporting surfaces 26 and 26a and the movable supporting surfaces 25 and 25a receive the pressing force of the cutter wheels 92 and 92a through the glass plate 2 and the belt 3.

Upon completion of the end-cut-line formation, the air cylinder units 89 and 89a are then actuated to raise the cutter wheels 92 and 92a, thereby canceling the contact between the cutter wheels 92 and 92a and the glass plate 2. Meanwhile, the cylinder units 35 and 35a are actuated to lower the movable receiving members 29 and 29a, thereby forming the steps 46 and 46a around the fixed supporting surfaces 26 and 26a, respectively.

Then, the motors 59 and 59a as well as 72 and 72a are operated to move the glass-plate receiving devices 7 and 7a in the X and Y directions to ensure that the steps 46 and 46a are located at the predetermined bend-breaking lines 221 and the fixed supporting surfaces 26 and 26a are constantly located on the inner sides of the predetermined bend-breaking lines 221. At the same time, the motors 114 and 114a as well as 135 and 135a are operated to move the press-breaking devices 9 and 9a in the X and Y directions, so that the push rods 88 and 88a will be constantly located on the outer sides of the predetermined bend-breaking lines 221.

During this movement of the glass-plate receiving devices 7 and 7a and the press-breaking devices 9 and 9a along the predetermined bend-breaking lines 221, the air cylinder units 85 and 85a are actuated at necessary locations to lower the push rods 88 and 88a and cause them to abut against the outer sides of the predetermined bend-breaking lines 221 of the glass plate 2, thereby press-breaking the glass plate 2 along the predetermined bend-breaking lines 221.

When the above-described press-breaking is finished, and the glass plate 2 bend-broken along the predetermined bend-breaking lines 221 is obtained, the cylinder units 35 and 35a are reversely actuated to raise the movable receiving members 29 and 29a so as to eliminate the steps 46 and 46a around the fixed supporting surfaces 26 and 26a, thereby making the fixed supporting surfaces 26 and 26a flush with the movable supporting surfaces 25 and 25a, whereupon the above-described operation is repeated.

With the glass-plate bend-breaking machine 1 using the glass-plate receiving devices 9 and 9a, during the end-cut-line formation by the cutter wheels 92 and 92a, the fixed supporting surfaces 26 and 26a and the movable supporting surfaces 25 and 25a are respectively made flush to support from below the glass plate 2 by means of the belt 3. Therefore, even if the relative positioning of the glass-plate receiving devices 9 and 9a with respect to the cutter wheels 92 and 92a is slightly offset, and the cutter wheels 92 and 92a are disposed, for example, above the movable supporting surfaces 25 and 25a, the glass plate 2 is supported from below by the movable supporting surfaces 25 and 25a as well. As a result, the end cut line 222 is formed in a desired manner, and since the steps 46 and 46a are formed during the press-breaking of the glass plate 2 by the push rods 88 and 88a, the bend-breaking of the glass plate 2 along the predetermined bend-breaking line 211 can be effected reliably.

It should be noted that, in addition to the end-cut-line formation, the predetermined bend-breaking line 211 may be formed by the press-breaking devices 9 and 9a of the glass-plate bend-breaking machine 1. In addition, with the glass-plate bend-breaking machine 1, press-breaking alone may be effected, and the end-cut-line formation may be effected in a preceding process, in which case the cutter wheels 92 and 92a and the like may be omitted.

Furthermore, although in the above-described embodiment there are provided the pair of glass-plate receiving devices 7 and 7a, the pair of moving devices 8 and 8a, the pair of press-breaking devices 9 and 9a, and the pair of moving devices 10 and 10a, and the end-cut-line formation and press-breaking with respect to the glass plate 2 are effected in an apportioned manner, the glass-plate bend-breaking machine may be alternatively constructed by being provided with one device, respectively, or by providing three or more devices, respectively.

What is claimed is:

1. A machine for bend-breaking a glass plate comprising:
a flexible member on which the glass plate is placed;
a supporting member for supporting a peripheral portion of the flexible member;
a glass plate receiving device disposed below the flexible member and including a glass plate receiving surface for receiving the glass plate from a lower surface of said glass plate by means of the flexible member in a region surrounded by the supporting member;
a first moving device for moving the glass plate receiving surface of the glass plate receiving device within a plane, which is parallel to the surface of the glass plate;
a press-breaking device disposed above the endless belt and including a pressing surface for press-breaking the glass plate which is placed on the flexible member and on which a cut line is formed, along the cut line, in the region surrounded by the supporting member;
a second moving device for moving the pressing surface of the press-breaking device within a plane, which is parallel to the surface of the glass plate; and
a carrying-in and carrying-out means for carrying the glass plate to be subjected to bend-breaking into the region surrounded by the supporting means and for carrying the glass plate subjected to bend-breaking out of the region surrounded by the supporting member,
the first and second moving devices operateing such that a moving position of the pressing surface corresponds to a moving position of the glass plate receiving surface in a press-breaking operation of the pressing surface of the press-breaking device for the glass plate above the endless belt in the region surrounded by the supporting member.

2. A machine for bend-breaking a glass plate according to claim 1, wherein said first moving device includes a moving mechanism for moving the glass plate receiving surface in one direction and in another direction intersecting with the one direction, within the plane, which is parallel to the surface of the glass plate.

3. A machine for bend-breaking a glass plate according to claim 1 or 2, wherein said second moving device includes a moving mechanism for moving the pressing surface in one direction and in another direction intersecting with the one direction, within the plane, which is parallel to the surface of the glass plate.

4. A machine for bend-breaking a glass plate according to claim 1, wherein said glass plate receiving surface has a movable supporting surface capable of advancing and retracting with respect to the lower surface of the glass plate for supporting the glass plate by means of the endless belt, said glass plate receiving device including an advancing/retracting means for advancing and retracting the movable supporting surface.

5. A machine for bend-breaking a glass plate according to claim 1, wherein said glass plate receiving surface has a movable supporting surface capable of advancing and retracting with respect to the lower surface of the glass plate for supporting the glass plate by means of the endless belt, and a fixed supporting surface fixed with respect to its approaching and moving-away directions relative to the lower surface of the glass plate for supporting the glass plate by means of the endless belt, said glass plate receiving device having an advancing/retracting means for advancing and retracting the movable supporting surface.

6. A machine for bend-breaking a glass plate according to claim 5, wherein said fixed supporting surface is disposed surrounded by the movable supporting surface.

7. A machine for bend-breaking a glass plate according to claim 4, wherein said advancing/retracting means comprises a cylinder unit, the movable supporting surface being connected to a piston rod of said cylinder unit.

8. A machine for bend-breaking a glass plate according to claim 1, wherein said glass plate receiving surface has a fixed supporting surface fixed with respect to its approaching and moving-away directions relative to the lower surface of the glass plate for supporting the glass plate by means of the endless belt.

9. A machine for bend-breaking a glass plate according to claim 1, wherein the flexible member has an endless belt, the machine for bend-breaking a glass plate further comprising a tension imparting means for imparting the tension to the endless belt.

10. A machine for bend-breaking a glass plate according to claim 1, wherein the flexible member has an endless belt, the machine for bend-breaking a glass plate further comprising a traveling means for traveling the endless belt.

11. A machine for bend-breaking a glass plate according to claim 1, further comprising; other supporting member for supporting the flexible member from the lower surface thereof in the region surrounded by the supporting member.

12. A machine for bend-breaking a glass plate according to claim 1, further comprising; other supporting member for supporting the flexible member from the lower surface thereof almost at the center of the region surrounded by the supporting member.

13. A machine for bend-breaking a glass plate according to claim 1, wherein the pressing surface has a planar surface, a cylindrical surface or a spherical surface for abutting on the surface of the glass plate to press-break the glass plate along a cut line.

14. A machine for bend-breaking a glass plate comprising:
a flexible member on which the glass plate is placed;
a supporting member for supporting a peripheral portion of the flexible member;
a plurality of glass plate receiving devices each disposed below the flexible member and including a glass plate receiving surface for receiving the glass plate from a lower surface of said glass plate by means of the flexible member in a region surrounded by the supporting member;
a plurality of first moving devices each for moving the glass plate receiving surface of the corresponding glass plate receiving device within a plane, which is parallel to the surface of the glass plate;
a plurality of press-breaking devices each disposed above the endless belt and including a pressing surface for press-breaking the glass plate which is placed on the flexible member and on which a cut line is formed, along the cut line, in the region surrounded by the supporting member;
a plurality of second moving devices each for moving the pressing surface of the corresponding press-breaking device within a plane, which is parallel to the surface of the glass plate; and
a carrying-in and carrying-out means for carrying the glass plate to be subjected to bend-breaking into the region surrounded by the supporting means and for carrying the glass plate subjected to bend-breaking out of the region surrounded by the supporting member,
the first and second moving devices each operating such that a moving position of the corresponding pressing surface corresponds to a moving position of the glass plate receiving surface in a press-breaking operation of the pressing surface of the corresponding press-breaking device for the glass plate above the endless belt in the region surrounded by the supporting member.

15. A machine for bend-breaking a glass plate according to claim 14, wherein each of said first moving devices includes a moving mechanism for moving the corresponding glass plate receiving surface in one direction and in another direction intersecting with the one direction, within the plane, which is parallel to the surface of the glass plate.

16. A machine for bend-breaking a glass plate according to claim 14 or 15, wherein each of said second moving devices includes a moving mechanism for moving the corresponding pressing surface in one direction and in another direction intersecting with the one direction, within the plane, which is parallel to the surface of the glass plate.

17. A machine for bend-breaking a glass plate according to claim 14, wherein each of said glass plate receiving surfaces has a movable supporting surface capable of advancing and retracting with respect to the lower surface of the glass plate for supporting the glass plate by means of the endless belt, each of said glass plate receiving devices including an advancing/retracting means for advancing and retracting the corresponding movable supporting surface.

18. A machine for bend-breaking a glass plate according to claim 14, wherein each of said glass plate receiving surfaces has a movable supporting surface capable of advancing and retracting with respect to the lower surface of the glass plate for supporting the glass plate by means of the endless belt, and a fixed supporting surface fixed with respect to its approaching and moving-away directions relative to the lower surface of the glass plate for supporting the glass plate by means of the endless belt, each of said glass plate receiving devices having an advancing/retracting means for advancing and retracting the corresponding movable supporting surface.

19. A machine for bend-breaking a glass plate according to claim 17, wherein each of said fixed supporting surfaces is disposed surrounded by the corresponding movable supporting surface.

20. A machine for bend-breaking a glass plate according to claim 14, wherein each of said advancing/retracting means comprises a cylinder unit, each of said movable supporting surfaces being connected to a corresponding piston rod of said cylinder unit.

21. A machine for bend-breaking a glass plate according to claim 14, wherein each of said glass plate receiving surfaces has a fixed supporting surface fixed with respect to its approaching and moving-away directions relative to the lower surface of the glass plate for supporting the glass plate by means of the endless belt.

22. A machine for bend-breaking a glass plate comprising:
a flexible member on which the glass plate is placed;
a supporting member for supporting the flexible member;
a glass plate receiving device including a glass plate receiving surface for receiving the glass plate from a lower surface of said glass plate by means of the flexible member;
a first moving device for moving the glass plate receiving surface of the glass plate receiving device;
a press-breaking device including a pressing surface for press-breaking the glass plate;
a second moving device for moving the pressing surface of the press-breaking device; and
a carrying-in and carrying-out means for carrying the glass plate to be subjected to bend-breaking in and for carrying the glass plate subjected to bend-breaking out,
the first and second moving devices operating such that a moving position of the pressing surface corresponds to a moving position of the glass plate receiving surface in a press-breaking operation of the pressing surface of the press-breaking device for the glass plate.

* * * * *

UNITED STATES PATENT AND TRADEMARK OFFICE
CERTIFICATE OF CORRECTION

PATENT NO.    : 6,218,793 B1
DATED         : April 17, 2001
INVENTOR(S)   : Bando It is certified that error appears in the above-identified patent and that said Letters Patent is hereby corrected as shown below:

<u>Title page,</u>
Item [54], change the title to -- MACHINE FOR BREAKING GLASS PLATE --.

Item [56], References Cited, delete the following references: Japanese 10073213; Japanese 07043424; Japanese 07132723; Japanese 08156241 and Japanese 2970117.

Signed and Sealed this

Twenty-seventh Day of August, 2002

Attest:

Attesting Officer

JAMES E. ROGAN
*Director of the United States Patent and Trademark Office*